A. D. WILLIAMSON.
GEARING.
APPLICATION FILED APR. 6, 1909.
939,179.
Patented Nov. 2, 1909.
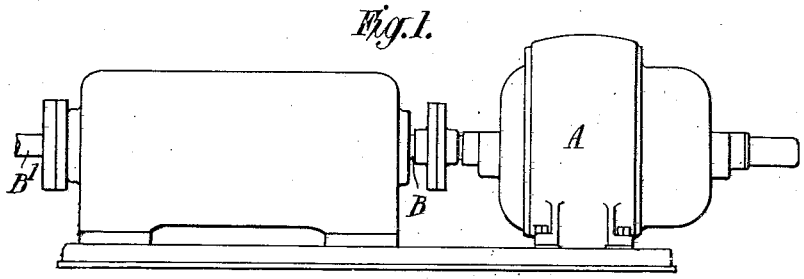
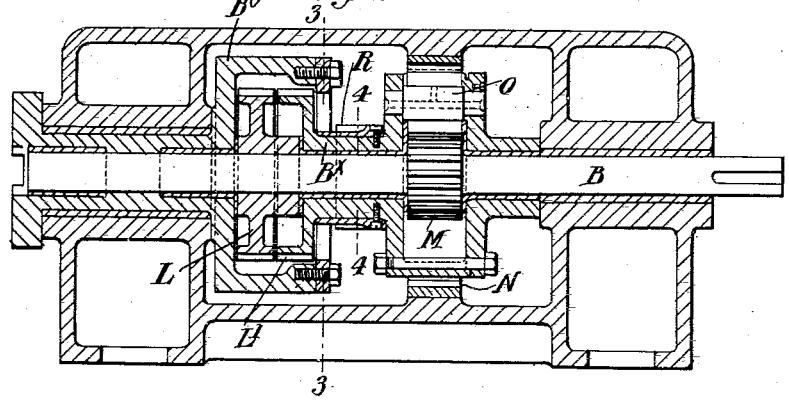
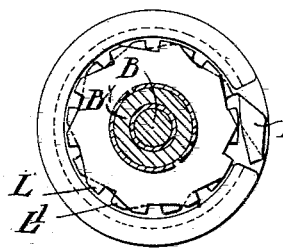
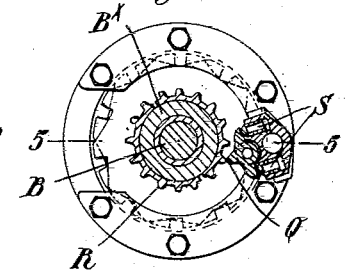
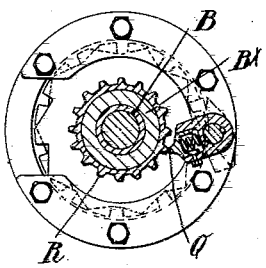
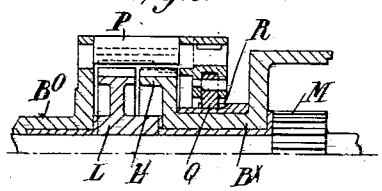
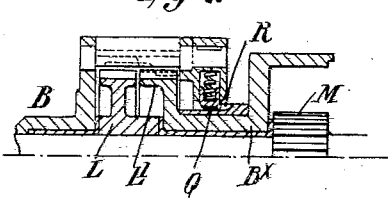
Witnesses:
F. E. Nares.
G. Blake
Inventor:
Alfred David Williamson,
by his attorney,
Edward T. Beach

UNITED STATES PATENT OFFICE.

ALFRED DAVID WILLIAMSON, OF SHEFFIELD, ENGLAND, ASSIGNOR TO VICKERS SONS & MAXIM LIMITED, OF SHEFFIELD, ENGLAND.

GEARING.

939,179.  Specification of Letters Patent.  Patented Nov. 2, 1909.

Original application filed May 18, 1908, Serial No. 433,615. Divided and this application filed April 6, 1909. Serial No. 488,293.

*To all whom it may concern:*

Be it known that I, ALFRED DAVID WILLIAMSON, a subject of the King of Great Britain, residing at River Don Works, Sheffield, in the county of York, England, have invented certain new and useful Improvements Relating to Gearing, of which the following is a specification.

This invention relates to planing and other reciprocating machines or mechanisms that are driven in opposite directions at different speeds by reversing electric motors. These machines are, broadly speaking, of two kinds, namely, those which work with a variable cutting speed and those which work with a constant cutting speed.

According to this invention change speed gearing is provided for driving the machine from the electric motor at a certain speed on the cutting stroke and at a different speed on the return stroke in combination with means, governed by the direction of rotation of the motor, for automatically controlling the aforesaid change speed gearing. Thus with a machine having a constant cutting speed, the gearing may be such as to reduce the speed at which the motor drives the machine on the cutting stroke to a speed of, say, twenty feet per minute. After the completion of the cutting stroke and while the motor is accelerating in speed for the quick return stroke, the gearing may operate to disengage or render inoperative its speed-reducing portion and to bring into operation its speed increasing portion so as to obtain a suitable speed ratio for the return stroke, say eighty feet per minute, or more as may be desired. Obviously this arrangement of gearing is also advantageous when used with a reversible variable speed electric motor.

At present it is customary to use with planing machines an electric motor having a speed range of 3:1 or 4:1 producing a cutting speed of say twenty feet per minute, and a corresponding quick return speed of from sixty to eighty feet per minute. An electric motor adapted to operate a planing machine in this manner is set forth in the specification of Letters Patent of the United States No. 760,289 patented May 17th 1904. In certain classes of work, however, it is necessary to have as low a cutting speed as ten feet per minute, and with a motor having a speed range of 3:1 the quick return motion would be only thirty feet per minute which is unsatisfactory. By the use of the speed changing device herein described the speed of the quick return stroke may be made as rapid as desired.

It is not necessary to use the highest speed of the motor for the quick return stroke; for instance, a motor having a speed varying from three hundred to nine hundred revolutions per minute on the cutting stroke may be run at six hundred revolutions per minute or even less on the quick return stroke, and thus the better acceleration due to the stronger field may be utilized.

One form of change speed gearing for accomplishing the object set forth above is described in the specification of my United States application for patent Serial No. 433615 and the present invention relates to a modified form of said gearing.

In order that the said invention may be clearly understood and readily carried into effect, it will now be described more fully with reference to the accompanying drawings, in which:—

Figure 1 is a side elevation of an electric motor and a gear box containing change speed gearing constructed according to this invention. Fig. 2 is an enlarged vertical section of the aforesaid gearing. Fig. 3 is a cross sectional elevation on the line 3—3 of Fig. 2, looking to the left, and showing the pawl and ratchet mechanism of the change speed gearing exposed. Fig. 4 is a cross sectional elevation on the line 4—4 of Fig. 2 looking to the left. Fig. 5 is a part sectional plan taken on the line 5—5 of Fig. 4. Figs. 6 and 7 are respectively a cross sectional elevation and part sectional plan corresponding to Figs. 4 and 5, and showing a modified arrangement.

A is the electric motor to which is directly coupled the shaft B, hereinafter called the driving or motor shaft.

B' is a shaft adapted to be driven by the motor shaft B and connected with the reciprocating mechanism of the planing or other machine.

L L' are two ratchet wheels having teeth formed thereon in opposite directions, and adapted to engage alternately with a locking device by means of which the power is transmitted from the motor or other source of power to the machine. One of these ratchet wheels, namely L, is keyed to the motor shaft B, and the other, namely L', is connected to or forms part of a driving sleeve B<sup>x</sup> rotatably mounted upon said motor shaft B and driven indirectly thereby at a speed differing from that of the shaft B by an amount determined by the intermediate gearing employed in driving said sleeve. This intermediate gearing is of the well known planetary type and comprises a toothed wheel M fixed to the motor shaft B, an internally toothed stationary wheel N concentric therewith, and one or more intermediate pinions O arranged in gear with said toothed wheels, and in the annular space between them and mounted upon the driving sleeve B<sup>x</sup> at the end remote from the ratchet wheel thereon.

The locking device, which, as shown in Figs. 3–5, is in the form of a double pawl P, is carried by the sleeve B⁰ secured to the driven shaft B', so that engagement of the pawl with the ratchet wheel L that is keyed to the motor shaft B, causes the sleeve B⁰ and driven shaft B' to rotate with and at the same speed as the motor shaft B, and engagement with the other ratchet wheel L' produced by a reversal of the motion, causes said sleeve B⁰ and driven shaft B' to rotate with the driving sleeve B<sup>x</sup> that is indirectly driven by the motor shaft B.

The double pawl P hereinbefore referred to is pivoted to the driven sleeve B⁰ and is provided with two oppositely placed ends whereof one end engages with one of the aforesaid ratchet wheels and the other end with the other ratchet wheel, the ends being in engagement alternately in accordance with the direction in which the motor or other source of power is running. There is also a dead or inoperative position of the double pawl P which position is however only assumed at the moment of starting in either direction when one end of the pawl is being lifted out of engagement with the corresponding ratchet wheel with which it was in engagement during the previous motion in the opposite direction. In order to automatically move the pawl beyond its dead or inoperative position and bring it into engagement for the reverse motion it is provided with a tail piece Q adapted to engage with a toothed ring R fitted upon the driving sleeve B<sup>x</sup> and arranged so that as said sleeve commences to rotate in the reverse direction, a tooth on the ring meets the tail piece Q and thus causes the pawl to be tilted over into its engaging position. This tail piece may be made slightly flexible or subject to spring pressure so that it may not become broken if it happens to come into contact with the top of a tooth on the ring instead of upon the side as would usually be the case.

In Figs. 4 and 5 this tail piece is shown controlled by two spring-actuated plungers S S.

In Figs. 6 and 7 a modified construction of this tail-piece is represented in which a single spring is employed to control the tail-piece Q.

What I claim and desire to secure by Letters Patent of the United States is:—

1. In a planing or other reciprocating machine, the combination with the shaft of a reversible electric motor, of a shaft adapted to be driven by the motor shaft, epicyclic gearing interposed between the motor shaft and the driven shaft, a device for rendering said epicyclic gearing operative and means governed by the rotation of the said motor shaft for automatically controlling the aforesaid device.

2. In a planing or other reciprocating machine, the combination with the shaft of a reversible electric motor, of a shaft adapted to be driven by the motor shaft, epicyclic gearing interposed between the motor shaft and the driven shaft, pawl and ratchet mechanism coöperating with said epicylic gearing, and means governed by the rotation of the said motor shaft for automatically controlling the coöperation of the epicyclic gearing with the aforesaid pawl and ratchet mechanism.

3. In a planing or other reciprocating machine, the combination with the shaft of a reversible electric motor, of a shaft adapted to be driven by the motor shaft, a ratchet wheel secured to the motor shaft, an oppositely toothed ratchet wheel driven indirectly by and at a different speed from the motor shaft, a double pawl carried by the driven shaft for engagement with one or other of said ratchet wheels, and means governed by the rotation of the said motor shaft for automatically controlling the aforesaid pawl.

4. In a planing or other reciprocating machine, the combination with the shaft of a reversible electric motor, of a shaft adapted to be driven by the motor shaft, a ratchet wheel secured to the motor shaft, an oppositely toothed ratchet wheel mounted loosely on said motor shaft, epicyclic gearing for driving the last mentioned ratchet wheel from the motor shaft, a double pawl carried by the driven shaft for engagement with one or other of said ratchet wheels, and means governed by the rotation of the said motor shaft for automatically controlling the aforesaid pawl.

5. In a planing or other reciprocating machine, the combination with the shaft of a reversible electric motor, of a shaft adapted to be driven by the motor shaft, a ratchet wheel secured to the motor shaft, an oppositely toothed ratchet wheel driven indirectly by and at a different speed from the motor shaft, a double pawl carried by the driven shaft for engagement with one or other of said ratchet wheels, a tail piece on the aforesaid pawl, and a rotary toothed ring engaging with said tail piece.

6. In a planing or other reciprocating machine, the combination with the shaft of a reversible electric motor, of a shaft adapted to be driven by the motor shaft, a ratchet wheel secured to the motor shaft, an oppositely toothed ratchet wheel driven indirectly by and at a different speed from the motor shaft, a double pawl carried by the driven shaft for engagement with one or other of said ratchet wheels, a spring-controlled tail piece on the aforesaid pawl, and a rotary toothed ring engaging with said tail piece.

7. In a planing or other reciprocating machine, the combination with the shaft of a reversible electric motor, of a shaft adapted to be driven by the motor shaft, a ratchet wheel secured to the motor shaft, an oppositely toothed ratchet wheel driven indirectly by and at a different speed from the motor shaft, a sleeve secured to the driven shaft, a double pawl carried by the sleeve for engagement with one or other of the aforesaid ratchet wheels, and means governed by the rotation of the said motor shaft for automatically controlling the aforesaid pawl.

8. In a planing or other reciprocating machine, the combination with the shaft of a reversible electric motor, of a shaft adapted to be driven by the motor shaft, a ratchet wheel secured to the motor shaft, an oppositely toothed ratchet wheel driven indirectly by and at a different speed from the motor shaft, a sleeve secured to the driven shaft, a double pawl carried by the sleeve for engagement with one or other of the aforesaid ratchet wheels, a tail piece on the aforesaid pawl, and a rotary toothed ring engaging with said tail piece.

9. In a planing or other reciprocating machine, the combination with the shaft of a reversible electric motor, of a shaft adapted to be driven by the motor shaft, a ratchet wheel secured to the motor shaft, an oppositely toothed ratchet wheel mounted loosely on said motor shaft, epicyclic gearing for driving the last mentioned ratchet wheel from the motor shaft, a sleeve secured to the driven shaft, a double pawl carried by the sleeve for engagement with one or other of the aforesaid ratchet wheels, and means governed by the rotation of the said motor shaft for automatically controlling the aforesaid pawl.

10. In a planing or other reciprocating machine, the combination with the shaft of a reversible electric motor, of a shaft adapted to be driven by the motor shaft, a ratchet wheel secured to the motor shaft, an oppositely toothed ratchet wheel mounted loosely on said motor shaft, epicyclic gearing for driving the last mentioned ratchet wheel from the motor shaft, a sleeve secured to the driven shaft, a double pawl carried by the sleeve for engagement with one or other of the aforesaid ratchet wheels, a tail piece on the aforesaid pawl, and a rotary toothed ring engaging with said tail piece.

In testimony whereof I affix my signature in presence of two witnesses.

ALFRED DAVID WILLIAMSON.

Witnesses:
   JNO. R. MECKLEY,
   S. J. DOUGLAS.